United States Patent
Xiao et al.

(10) Patent No.: US 10,532,781 B2
(45) Date of Patent: Jan. 14, 2020

(54) ROBOTIC DEVICE FOR PROVIDING VERTICAL MOBILITY

(71) Applicant: Research Foundation of the City University of New York, New York, NY (US)

(72) Inventors: Jizhong Xiao, River Edge, NJ (US); Kenshin Ushiroda, New York, NY (US); SaiadiVishnu Sanigepalli, New York, NY (US); Guoyong Yang, River Edge, NJ (US)

(73) Assignees: InnovBot, LLC, Yorktown Heights, NY (US); Research Foundation of the City University of New York, New York, NY (US)

( * ) Notice: Subject to any disclaimer, the term of this patent is extended or adjusted under 35 U.S.C. 154(b) by 0 days.

(21) Appl. No.: 16/309,308

(22) PCT Filed: Jul. 3, 2017

(86) PCT No.: PCT/US2017/040621
§ 371 (c)(1),
(2) Date: Dec. 12, 2018

(87) PCT Pub. No.: WO2018/006100
PCT Pub. Date: Jan. 4, 2018

(65) Prior Publication Data
US 2019/0337579 A1     Nov. 7, 2019

Related U.S. Application Data

(60) Provisional application No. 62/357,607, filed on Jul. 1, 2016.

(51) Int. Cl.
*B62D 57/024* (2006.01)
*B62D 55/075* (2006.01)
(Continued)

(52) U.S. Cl.
CPC .......... *B62D 55/075* (2013.01); *B62D 55/24* (2013.01); *B62D 55/265* (2013.01);
(Continued)

(58) Field of Classification Search
CPC .... B62D 55/075; B62D 55/24; B62D 55/265; B62D 57/00; B62D 57/024
See application file for complete search history.

(56) References Cited

U.S. PATENT DOCUMENTS

| 4,330,865 A | 5/1982 | Hyde et al. |
| 4,865,140 A | 9/1989 | Cottam |

(Continued)

OTHER PUBLICATIONS

ISA/US; International Search Report/Written Opinion for International application PCT/US17/40621 dated Sep. 28, 2017.

*Primary Examiner* — Joseph M Rocca
*Assistant Examiner* — Michael R Stabley
(74) *Attorney, Agent, or Firm* — Peter J. Mikesell; Schmeiser, Olsen & Watts, LLP

(57) ABSTRACT

A robotic device for providing vertical mobility has a payload is disposed inside a central compartment and supported by a skid. The skid can move up and down through latch and hook pairs to keep intimate contact with the surface and cross over bumps. The apparatus uses a flexible seal to create a reliable vacuum chamber. The flexible seal comprises a foam ring inside fabric pocket. A plurality of rod and spring strips are configured to apply a downward force to the flexible seal to conform with surface curvatures. The fabric pocket fills in the gaps or seams to maintain a vacuum. The air flows inside a manifold and passes through a filter to avoid debris from damaging the vacuum motor assembly.

16 Claims, 12 Drawing Sheets

(51) Int. Cl.
*B62D 55/24* (2006.01)
*G01S 13/88* (2006.01)
*B62D 55/265* (2006.01)
*F03D 17/00* (2016.01)

(52) U.S. Cl.
CPC .......... *B62D 57/024* (2013.01); *G01S 13/885* (2013.01); *F03D 17/00* (2016.05)

(56) References Cited

U.S. PATENT DOCUMENTS

| | | | |
|---|---|---|---|
| 5,752,577 A * | 5/1998 | Urakami | B62D 57/00 180/164 |
| 5,852,984 A | 12/1998 | Maysuyama et al. | |
| 5,947,051 A * | 9/1999 | Geiger | B62D 57/00 114/222 |
| 6,691,811 B2 | 2/2004 | Bruntrup | |
| 6,691,881 B1 | 2/2004 | Masse | |
| 6,964,312 B2 | 11/2005 | Maggio | |
| 7,076,335 B2 | 7/2006 | Seemann | |
| 7,404,464 B2 | 7/2008 | Imus et al. | |
| 7,520,356 B2 | 4/2009 | Sadegh et al. | |
| 7,775,312 B2 | 8/2010 | Maggio | |
| 8,127,390 B2 | 3/2012 | Kim | |
| 9,688,326 B2 | 6/2017 | Xiao | |
| 2003/0066160 A1 | 4/2003 | Meller | |
| 2003/0108395 A1 | 6/2003 | Douglas et al. | |
| 2015/0059120 A1 | 3/2015 | Riehl | |
| 2015/0251318 A1* | 9/2015 | Lv | A47L 9/009 180/8.1 |

\* cited by examiner

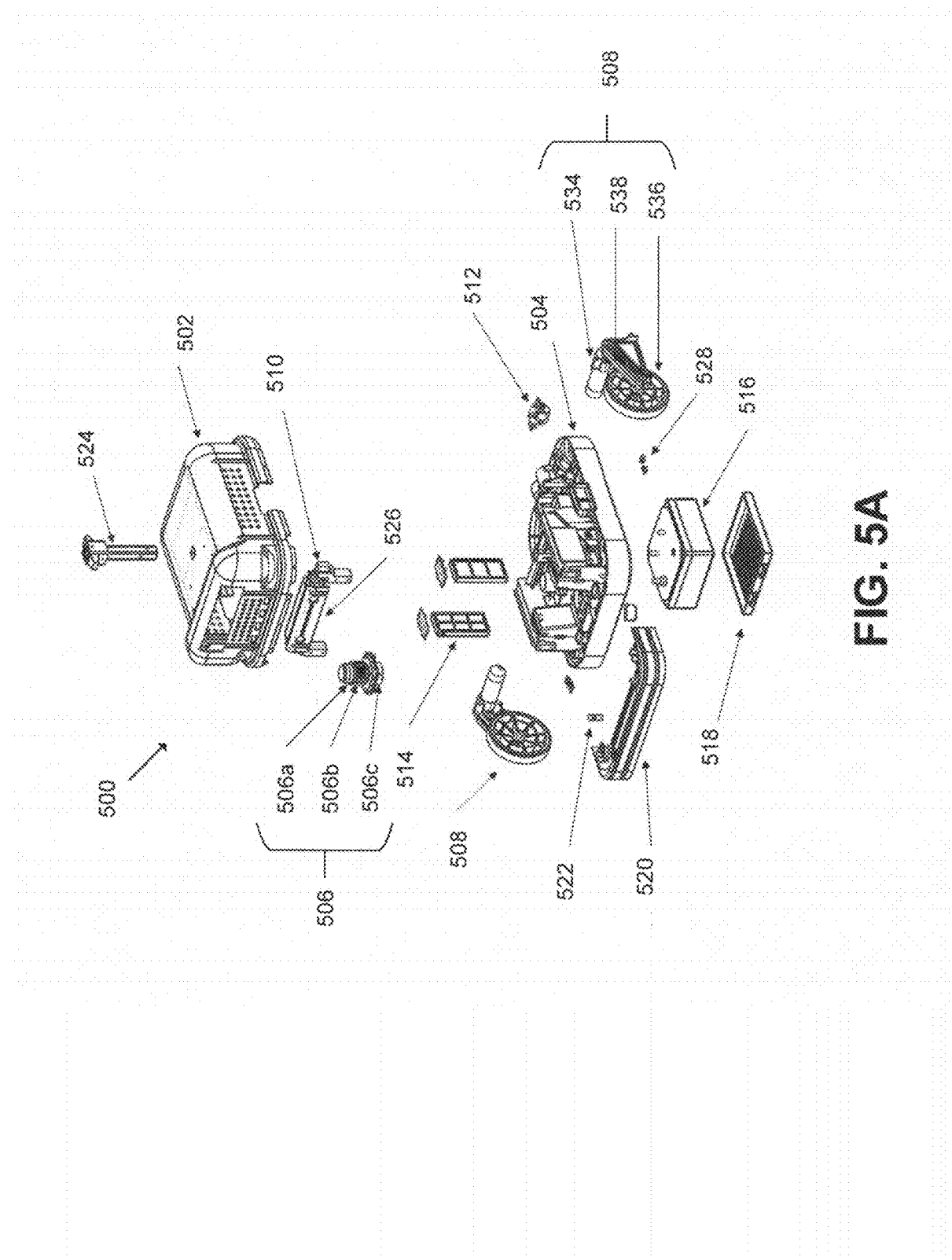

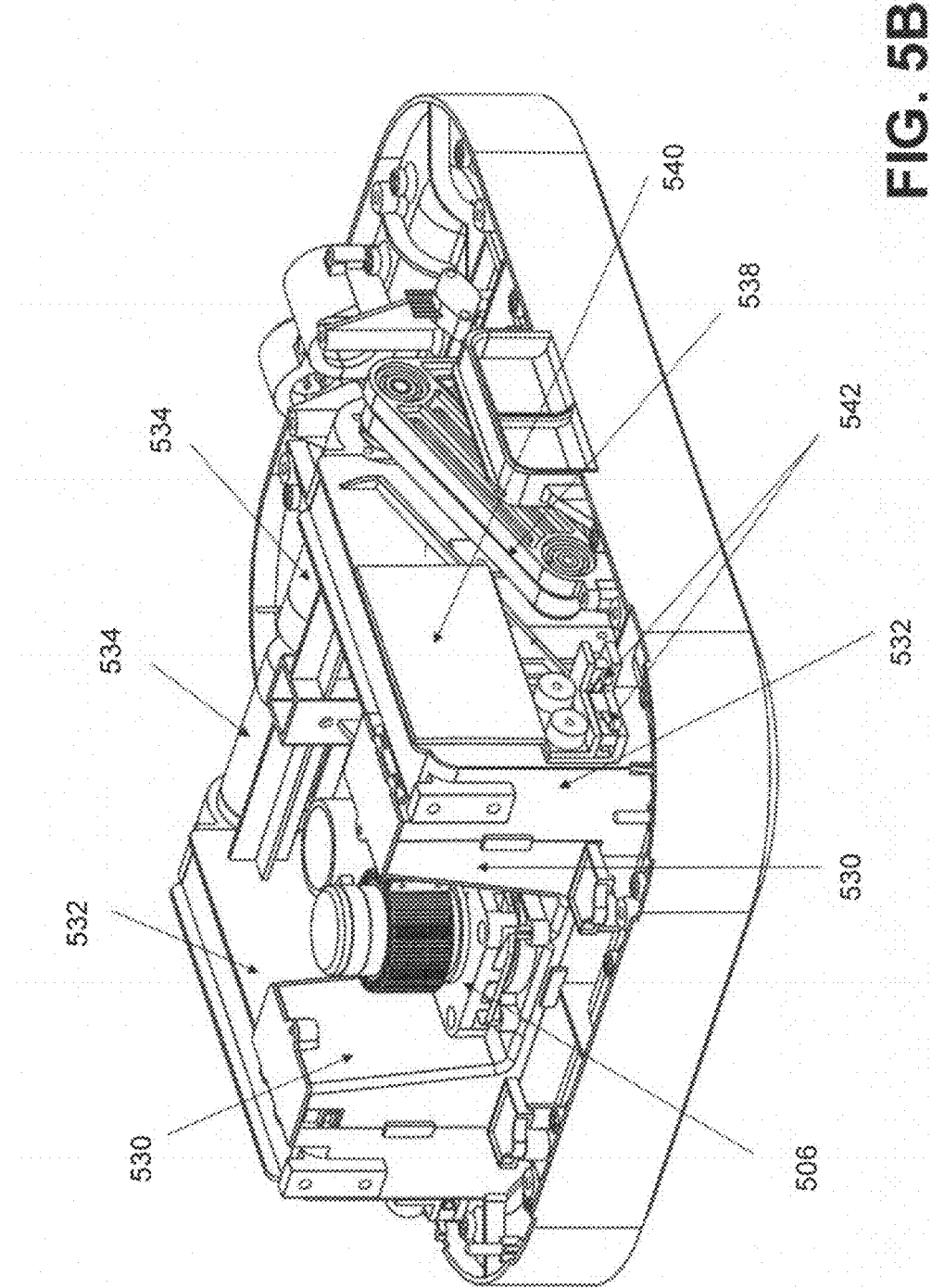

ROBOTIC DEVICE FOR PROVIDING VERTICAL MOBILITY

CROSS-REFERENCE TO RELATED APPLICATIONS

This application claims priority to and is a non-provisional of U.S. Patent Application 62/357,607 (filed Jul. 1, 2016), the entirety of which is incorporated herein by reference.

BACKGROUND OF THE INVENTION

The subject matter disclosed herein relates to robotic devices that move across a vertical surface. There are three major challenges in using vacuum to attach and move across a wall. The first challenge is maintaining mobility while at the same time sticking strongly to the wall. This first challenge is significant as these properties are contradictory. The second challenge is maintaining a seal while moving across the wall. This is difficult as there are many types of surfaces such as flat surfaces or faces with curvatures as well as surface features, such as seams or ridges, which may make it difficult to maintain a vacuum seal. The third challenge is avoiding debris that can damage the impeller or vacuum motors. It is very common for concrete structures to have debris that are likely to damage the device. An improved device is therefore desirable.

The discussion above is merely provided for general background information and is not intended to be used as an aid in determining the scope of the claimed subject matter.

BRIEF DESCRIPTION OF THE INVENTION

An apparatus for providing vertical mobility is described. A vacuum chamber is circumscribed by a flexible seal. A vacuum motor and impeller assembly evacuates the chamber and presses a payload, such as a ground penetration radar (GPR), against a flat surface (e.g. a wall or ground) or curved surfaces (e.g., surface of wind turbine blade).

A robotic device for providing vertical mobility is disclosed that has a payload is disposed inside a central compartment and supported by a skid. The skid can move up and down through latch and hook pairs to keep intimate contact with the surface and cross over bumps. The apparatus uses a flexible seal to create a reliable vacuum chamber. The flexible seal comprises a foam ring inside fabric pocket. A plurality of rod and spring strips are configured to apply a downward force to the flexible seal to conform with surface curvatures. The fabric pocket fills in the gaps or seams to maintain a vacuum. The air flows inside a manifold and passes through a filter to avoid debris from damaging the vacuum motor assembly.

In a first embodiment, a robotic device for providing vertical mobility is provided. The robotic device comprising: a housing enclosing a vacuum chamber that is exposed to an opening on a lower surface of the housing; a flexible seal circumscribing the opening; a plurality of rod and spring strips configured to apply a downward force to the flexible seal; a payload disposed inside a central compartment, the payload being supported by a skid that is vertically mobile; a vacuum motor assembly operatively connected to the vacuum chamber; a means for moving the robotic device across a surface, the means for moving being at least one wheel or at least one tank tread; wherein actuation of the vacuum motor assembly creates a vacuum in the vacuum chamber that pulls the housing toward the surface such that the means for moving is pressed against the surface.

In a second embodiment, a robotic device for providing vertical mobility is provided. The robotic device comprising: a housing enclosing a vacuum chamber that is exposed to an opening on a lower surface of the housing, the vacuum chamber has a central compartment with a payload disposed therein; a flexible seal that circumscribes the opening; a vacuum motor assembly operatively connected to the vacuum chamber; a means for moving the robotic device across a surface, the means for moving being at least one wheel or at least one tank tread, wherein the means for moving is directly connected to the housing such that actuation of the vacuum motor assembly creates a vacuum in the vacuum chamber and pulls the housing toward the surface such that the means for moving is pressed against the surface; wherein the payload is supported by a skid such that the payload is vertically mobile, but not laterally mobile, within the central compartment.

In a third embodiment, a robotic device for providing vertical mobility is provided. The robotic device comprising: a housing enclosing a vacuum chamber that is exposed to an opening on a lower surface of the housing; a flexible seal circumscribing the opening; a plurality of rod and spring strips configured to apply a downward force to the flexible seal; a ground penetration radar unit disposed inside a central compartment that is within the housing, the ground penetration radar unit being supported by a skid that is vertically mobile, wherein the ground penetration radar unit is supported by a skid such that the ground penetration radar unit is vertically mobile, but not laterally mobile, within the central compartment; a vacuum motor assembly operatively connected to the vacuum chamber; a means for moving the robotic device across a surface, the means for moving being at least one wheel or at least one tank tread; wherein actuation of the vacuum motor assembly creates a vacuum in the vacuum chamber that pulls the housing toward the surface such that the means for moving is pressed against the surface.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 5A is an exploded view of another apparatus for vertical mobility;

FIG. 5B illustrates the housing of the apparatus of FIG. 5A;

DETAILED DESCRIPTION OF THE INVENTION

Disclosed in this application is an apparatus that provides vertical mobility for non-destructive testing (NDT) instruments and cameras. Such an apparatus is useful for the purpose of inspection of large structures with large flat areas such as, but not limited to, building façades, dams, tunnels, and bridges, or surfaces with a curvature such as wind turbine blades. The apparatus is designed to be operable in any orientation whether it be on the ground, on the wall or on a ceiling, and is designed to overcome small gaps, ledges and other features that may be found on these surfaces. The device may be configured for other purposes such as surveillance and surface cleaning.

This disclosure also provides a method and apparatus for moving on both rough and smooth surfaces of vertical walls reliably. The method and apparatus permit carrying a payload that can be fitted into a central compartment. Examples of payloads include a ground penetration radar (GPR) antenna or other NDT instrument.

There are several configurations described in this disclosure. These configurations differ in size to accommodate different models of NDT instrument. Some of the mechanical features that the configurations share are a vacuum motor and impeller assembly, filters and manifold that allows air flow inside a housing unit, a flexible seal, a means for moving (e.g. a drive train), and a central compartment within a vacuum chamber where the NDT instrument resides.

Figure 1:
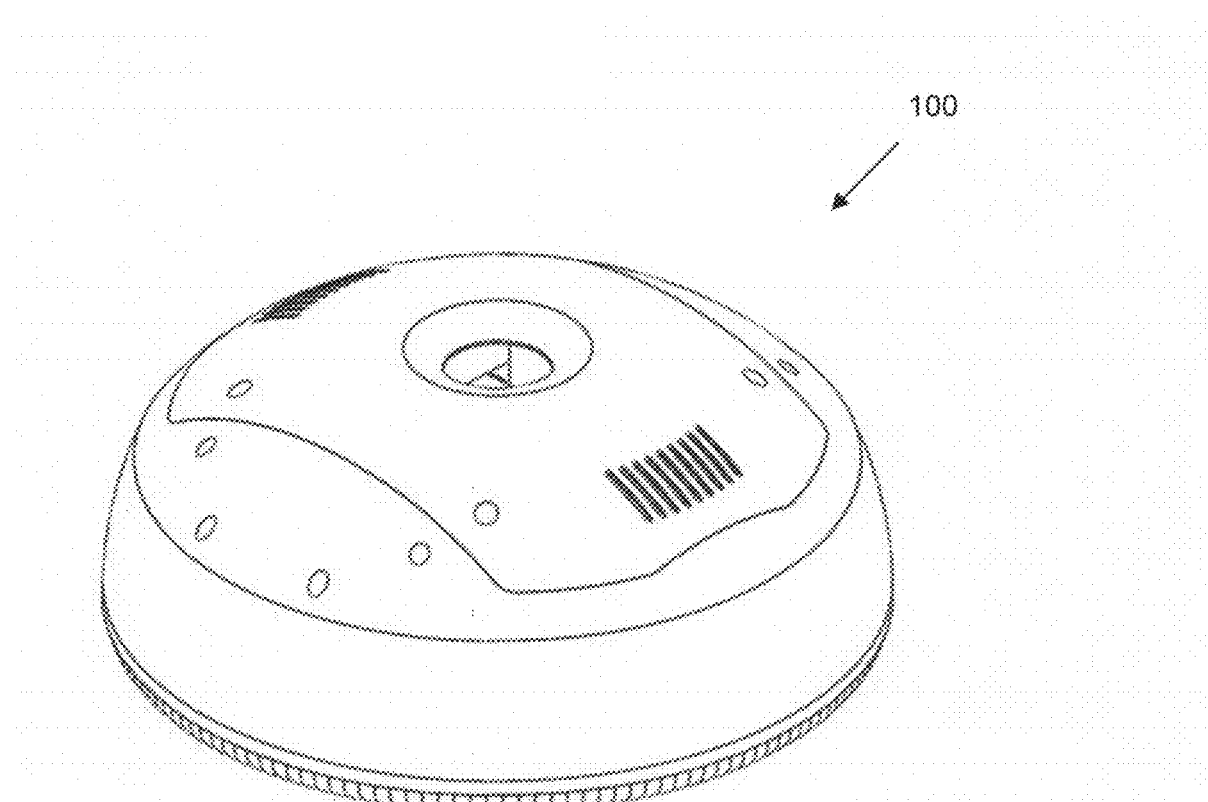
FIG. 1 is a top perspective view of an apparatus for vertical mobility.
Figure 2:
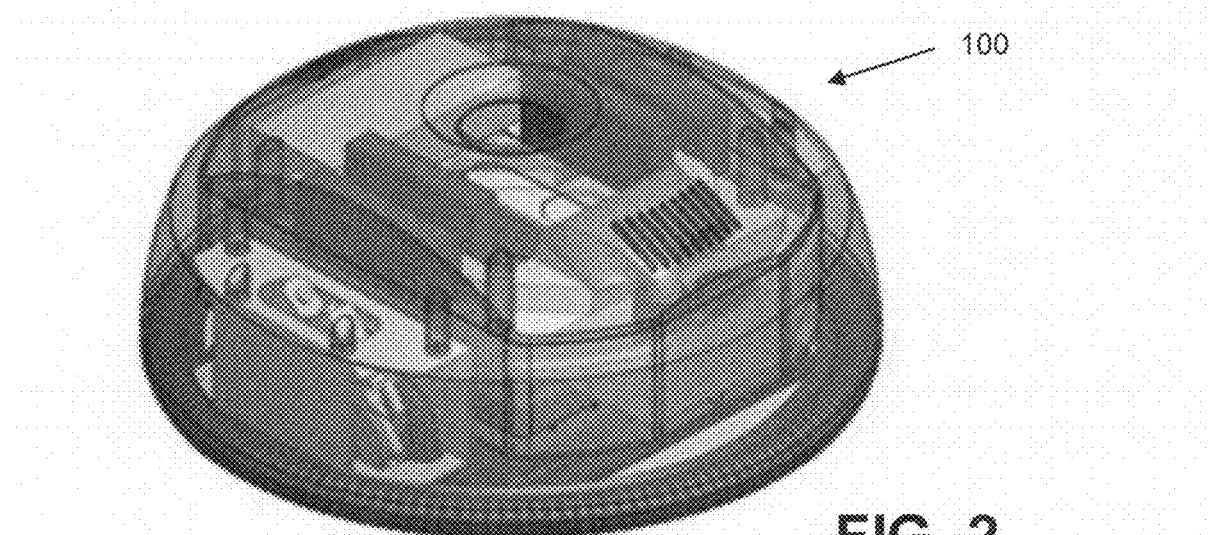
FIG. 2 illustrates the apparatus of FIG. 1 with the housing shown in phantom.
Figure 3:
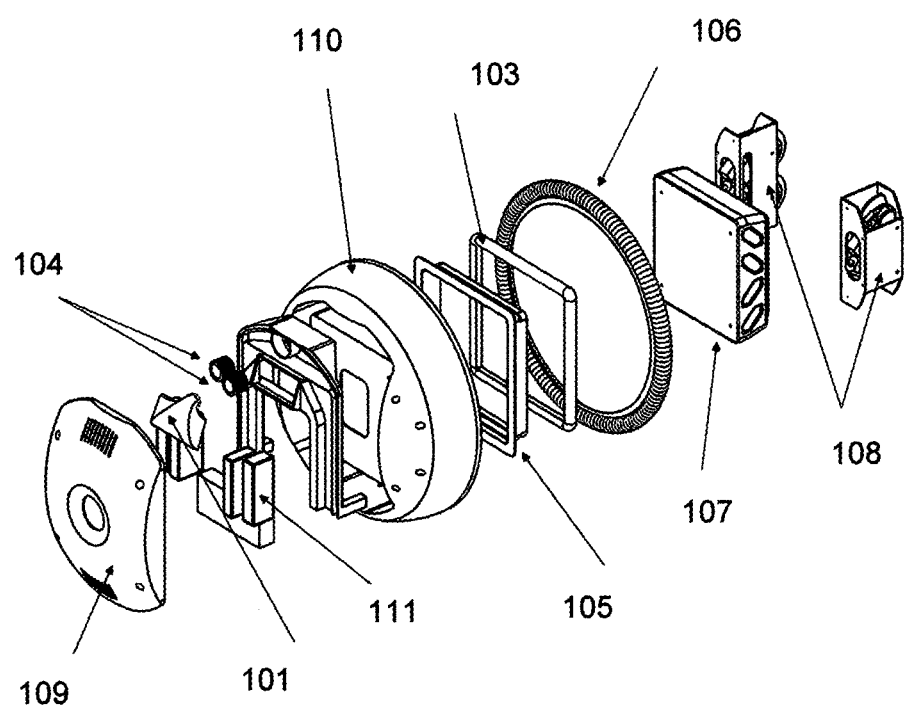
FIG. 3 is a top exploded view of the apparatus of FIG. 1.

Apparatus 100 (FIG. 1, FIG. 2 and FIG. 3) is purposed to carry a large dual frequency model GPR antenna for deep penetration intended for dam and tunnel inspection. Apparatus 100 comprises a vacuum motor 104; a flexible seal 106; a means for moving 108 and a housing 110. Injection molding with a durable plastic, such as Acrylonitrile Butadiene Styrene (ABS), is appropriate for its construction. The apparatus 100 comprises a chamber (not shown) with an open side which rests on a vertical surface such as the side of a building. In one embodiment the flexible seal 106 is an outer circular flexible seal.

Air is evacuated from the chamber with the vacuum motor 104 to create a vacuum inside the chamber which allows the apparatus to adhere to a wall without any support from outside. The air passes through a filter (not shown in FIG. 3 but see FIG. 5A) inside the curved duct filter compartment 101 and is drawn out of the chamber. The chamber does not directly contact the wall, but flexible seal 106 are attached and sealed to minimize as much air flow into the chamber as possible. The flexible seal 106 is comprised of a foam ring wrapped inside a polymer or Nylon fabric pocket and is attached and sealed around the main body to create vacuum chamber and to conform to the contact surface as much as possible. The square shaped inner flexible skirt seal 103 is attached to the skirt mount 105 to ensure reliable vacuum and minimize as much air flow into the vacuum chamber as possible. Friction and mobility is provided by a means for moving 108 such as (1) tank treads or (2) wheels installed on the inside of the chamber on two opposing sides, and the space in between is left open as central compartment to hold a specialized payload such as the GPR unit 107. The payload is capable of contacting the surface directly for optimized performance. The aforementioned components are held together by the housing 110 and are protected by a cover 109. The apparatus is powered by a battery pack 111.

The vacuum motor 104 includes an impeller that is designed to drive air out of the chamber and maintain a significant vacuum pressure while at the same time maintaining a relatively large air flow, as the seal with the wall is not required to be perfectly air tight. A vacuum motor in the vacuum motor 104 is provided that matches the torque and rotations per minute (RPM) required for the impeller is used. A pressure sensor (not shown) can be installed inside the chamber that provides feedback to rapidly adjust vacuum motor speed in order to maintain low pressure inside the vacuum chamber for maintaining adhesion to the wall at all times during operation.

The flexible seal 106 around the perimeter is designed to provide the maximum area for adhesion force, conforming to the surface textures, features and geometry of the wall, while limiting its own force onto the surface. This is made possible by making the flexible seal 106 slightly larger than the perimeter of the chamber and making the physical attachment to the chamber very flexible. One flexible seal design is a low density foam wrapped inside a nylon fabric pocket. The low density foam conforms to surface geometry and the nylon fabric fills in gaps while making the flexible seal relatively air tight. Nylon is abrasion resistant and has a low friction coefficient useful for sliding across rough surfaces like concrete. The flexible seal 106 is connected to the chamber by fastening/screwing the pocket rim into the edge of the main body with a plastic ring. This way, the majority of the adhesion force goes directly to the chamber and therefore the means for moving 108, and only a small percentage of the down force is exerted onto the flexible seal 106, thereby allowing the apparatus 100 to move across the surface with minimal friction.

The circular shape of apparatus 100 circumscribes the square center chamber, leaving crescent shaped cavities in the sides, front and back. The sides are populated by the means for moving 108 (e.g., a drive train) including the drive motors, wheels and gearboxes. Worm drive motors are shown used in the design because of their relatively narrow shape and high torque to weight ratio. The front, back and top are populated by the vacuum motors and electronics.

The means for moving 108 is made as narrow as possible, in order to allow the GPR instrument to get close to the edge of the walls as much as possible. The size and power of the drive motors is dictated by the overall weight of the vehicle. The torque output at the wheels must be able to overcome the weight of the apparatus with its payload because it will be working directly against gravity as it will typically operate on a vertical surface. Steering is a differential drive for both apparatus 100, apparatus 400, apparatus 500 and apparatus 700 allowing for pivot turning.

Figure 9A:
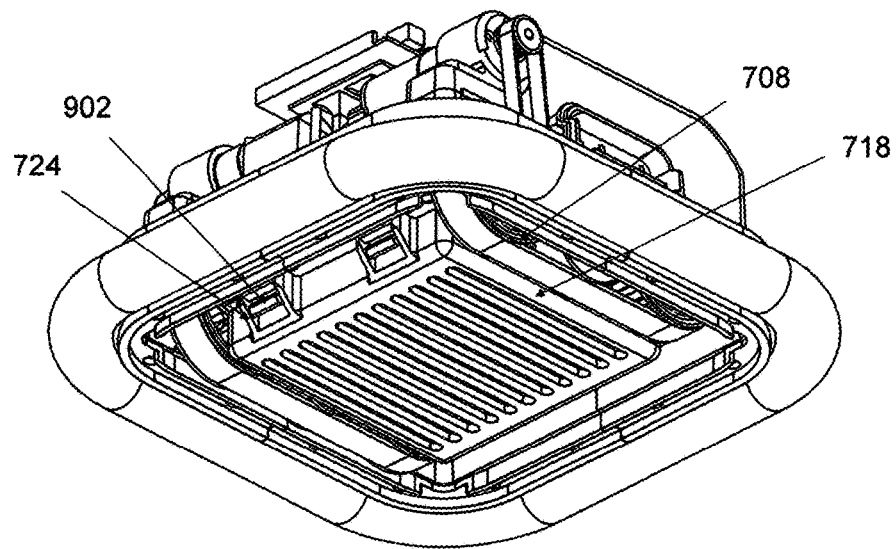
FIG. 9A is a bottom perspective view of the apparatus of FIG. 7 where a central compartment is covered by a skid.
Figure 9B:
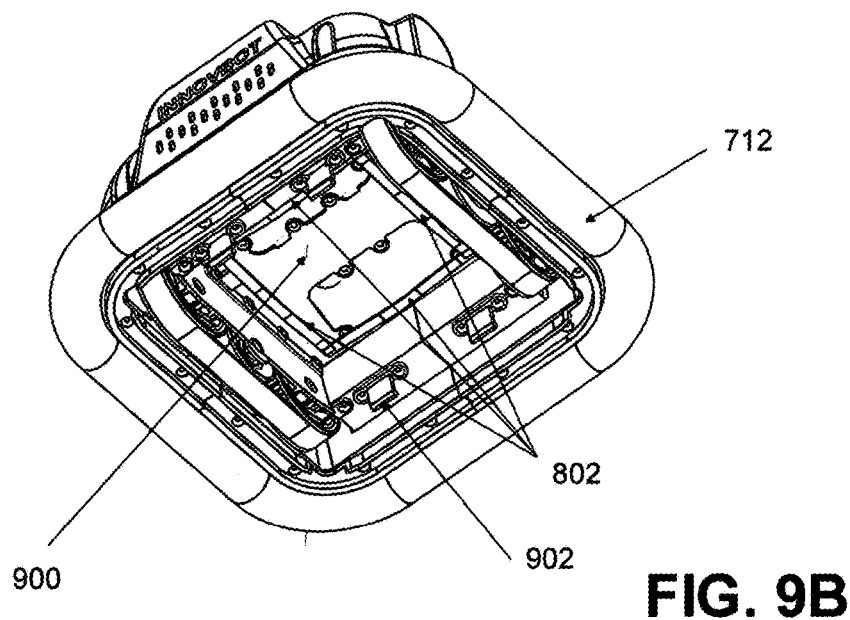
FIG. 9B is a bottom perspective view of the apparatus of FIG. 7 where the skid is removed to show the central compartment.

The payload is often required to contact the wall surface directly for the best measurement results. Therefore, a cavity with four walls is made within the chamber to fit around the payload so that it may move up and down, but not laterally. Tolerances are made forgiving to allow for a moderate amount of tilt. The payload instrument is spring loaded onto the surface with bended spring strips to press the sensor toward the wall surface. The payload's extrusion from the cavity is limited by latches. See FIG. 7, FIG. 9A and FIG. 9B.

The housing 110 serves multiple purposes as it may be used for noise dampening, and a smooth surface in order to minimize snagging on to power/signal cables and safety cable connecting through the central hole to the device while it moves.

Figure 4A:
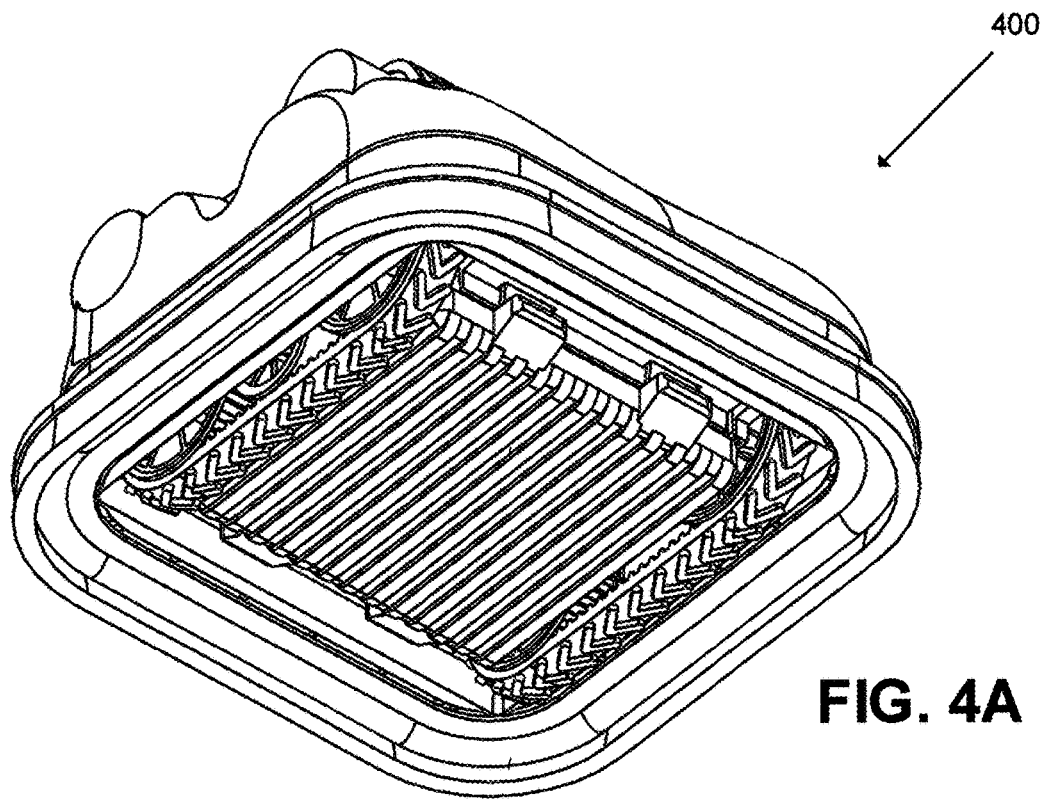
FIG. 4A is a bottom perspective view of an apparatus for vertical mobility.
Figure 4B:
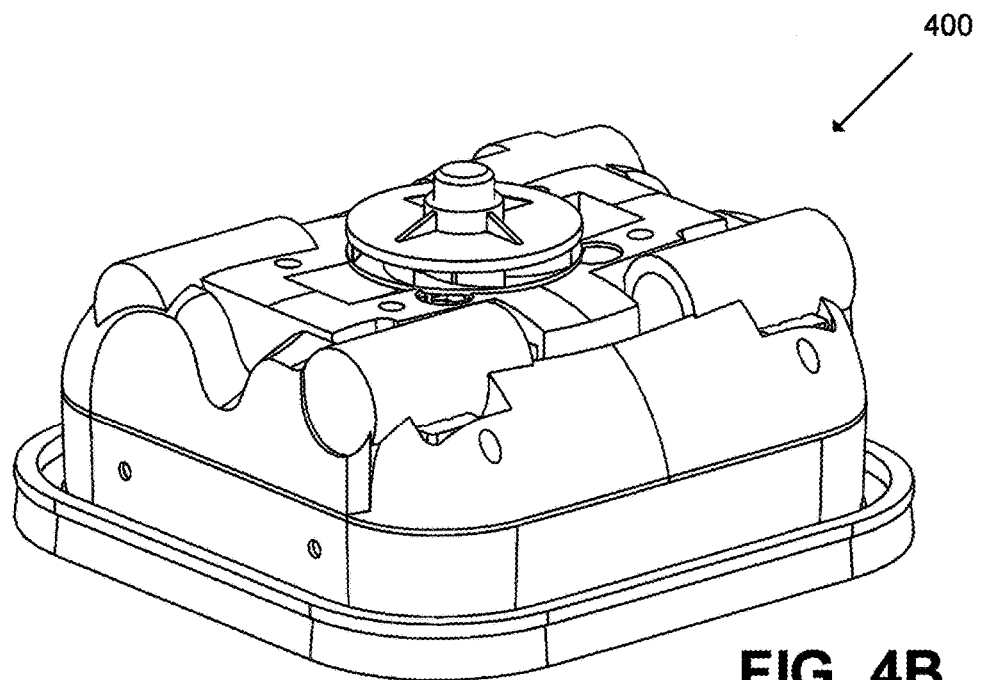
FIG. 4B is a top perspective view of an apparatus for vertical mobility.

Apparatus 400 (FIG. 4A, FIG. 4B) is designed to carry a different model of GPR which is approximately six inches across the overall dimensions. Apparatus 400 is much smaller than apparatus 100, as it is intended to carry a much smaller and lighter GPR instrument, but fundamentally both devices are similar.

A square shape of apparatus 400 is used in order to get the GPR as close to the edges of the wall as possible. Because there is not much space on the perimeter, the electronics and vacuum motor for this model is placed above the chamber. Tank treads are used in this design as it serves multiple purposes: power transmission and friction surface, thereby providing space savings on the sides.

FIG. 5A depicts another embodiment wherein apparatus 500 is shown. Apparatus 500 comprises a cover 502 and a housing 504. A vacuum motor assembly 506 consists of a vacuum motor 506a, heat sink 506b around the vacuum motor 506a, and an impeller 506c. The vacuum motor assembly 506 draws air from gaps between the contact surface and bottom of housing unit and creates a vacuum around a central chamber (600, see FIG. 6A) that host NDT instrument (e.g., GPR sensor unit) inside a central compartment. Intake air and/or exhaust air that drawn by the vacuum motor assembly 506 passes through air filters 514 inside the filter compartment (530, FIG. 5B) to avoid damage of the impeller 506c by the debris. The air flows within the drive wheel compartment (532, FIG. 5B) and filter compartment 530 along the manifold created by the inner surface of the compartments as shown in FIG. 5 C. An electronics control board 540 and switches 542 are also depicted in FIG. 5B.

In one embodiment, the means for moving 508 comprises a drive motor 534 and a drive wheel 536 that are connected by a time belt 538. The drive motor 534 is operatively connected in the housing 504 and drives the drive wheel 536 through the time belt 538 and bearings. The drive wheel 536 is enclosed inside the drive wheel compartment 532. An omni-directional wheel 512 facilitates moving of the apparatus 500, including pivot turning. The omni-directional wheel 512 is freely mobile and passive without actuator. The two drive wheels 536 and one omni-directional wheel 512 are in contact with the wall surface to keep the housing 504 on planar surface. A payload 516 (e.g. a GPR unit or other NDT sensor) is held within the central compartment 604 by a skid 518 within the vacuum chamber 600. The skid 518 attaches to the housing 504 with hooks 602 (see FIG. 6A). Four bended spring strips 802 (see FIG. 6A) on the bottom of the central compartment push the payload against the skid. The hooks have space for the skid (and thus the payload 516) to move vertically, but not laterally, within the vacuum chamber. Such a configuration helps maintain the payload 516 in close proximity to the surface while still allowing the payload 516 to move over bumps.

The housing 504 also comprises a bumper 520 on an external side of the housing 504 (FIG. 5A). The bumper 520 is operationally connected with housing 504 to detect obstacles by means of two sets of switches 528 on left and right sides of housing 504 (FIG. 5B). Each set of switches 528 has two switches to detect the bumper motion in two directions (forward/backward, and sideway). Apparatus 500 also has a range sensor 522 that scanning in a downward direction to detect edge of a wall surface. Apparatus 500 comprises a handle 524 that provides a grasping location for a gripper to deliver the apparatus to vertical wall surfaces. Apparatus 500 comprises a visual perception sensor 526 (e.g., stereo camera) to detect cracks on wall surface, and a servo motor 510 that tilts the stereo camera 526 by ±45 degree up and down.

Figure 5C:
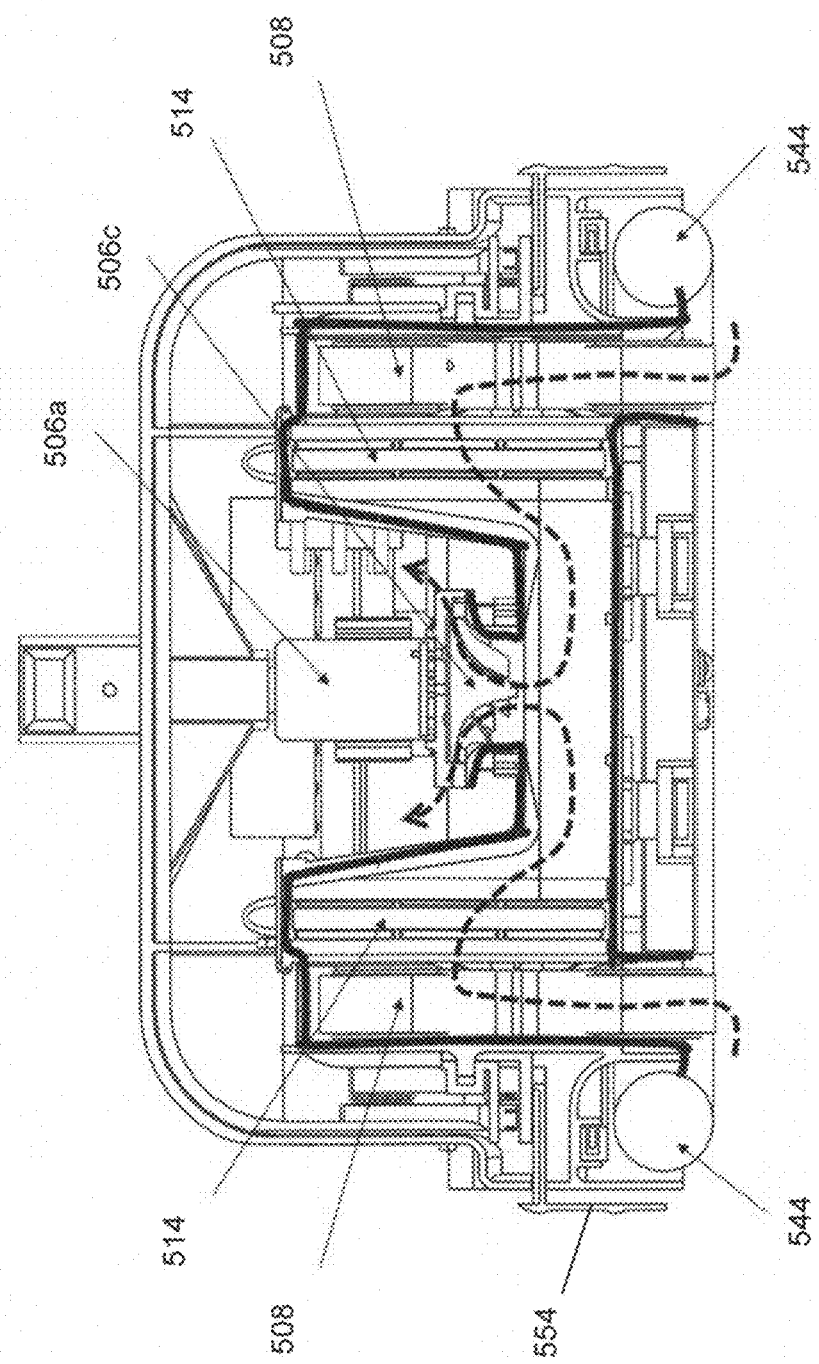
FIG. 5C is a cut-off view of the apparatus of FIG. 5A showing the air flow.
Figure 6A:
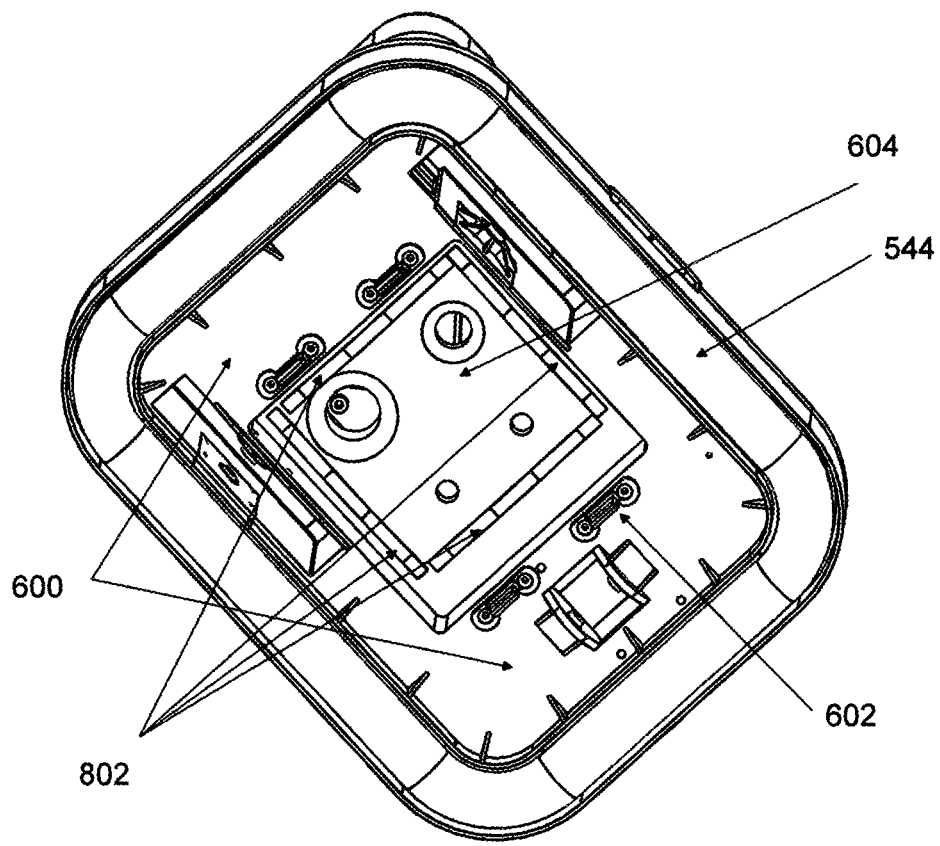
FIG. 6A is a bottom perspective view of the apparatus of FIG. 5A showing a vacuum chamber with central compartment.

A flexible seal 544 encloses the housing 504 that created the vacuum chamber to adhere to wall surface. As shown in FIG. 5C and FIG. 6A, the flexible seal 544 circumscribes the perimeter of the housing 504, and is protected by the housing rim 554.

Figure 6B:
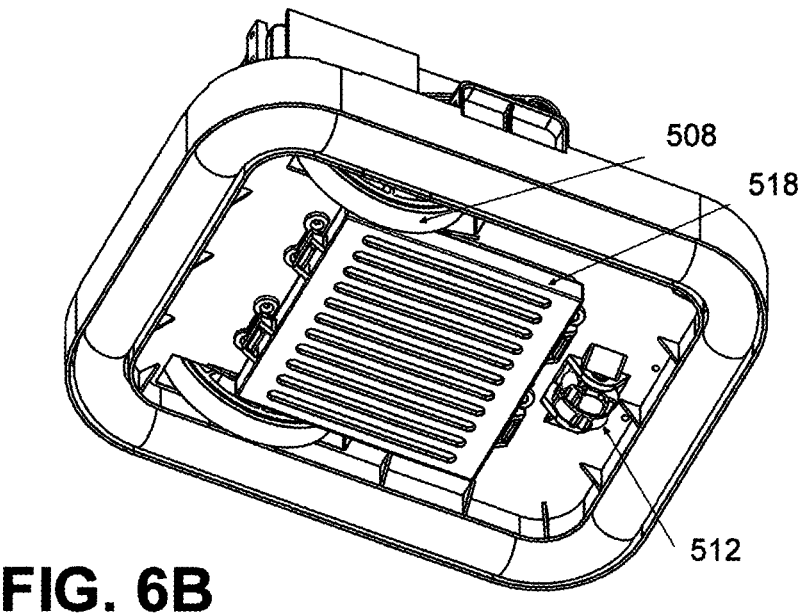
FIG. 6B is a bottom perspective view of the apparatus of FIG. 5A where the central compartment is covered by a skid.

As shown in FIG. 6A, the bottom of apparatus 500 has a flexible seal 554 that circumscribes the opening of the vacuum chamber 600 and central compartment 604 (see FIG. 6A). FIG. 6B shows the skid 518, omni-direction wheel 512 and the drive wheel 508.

Figure 7:
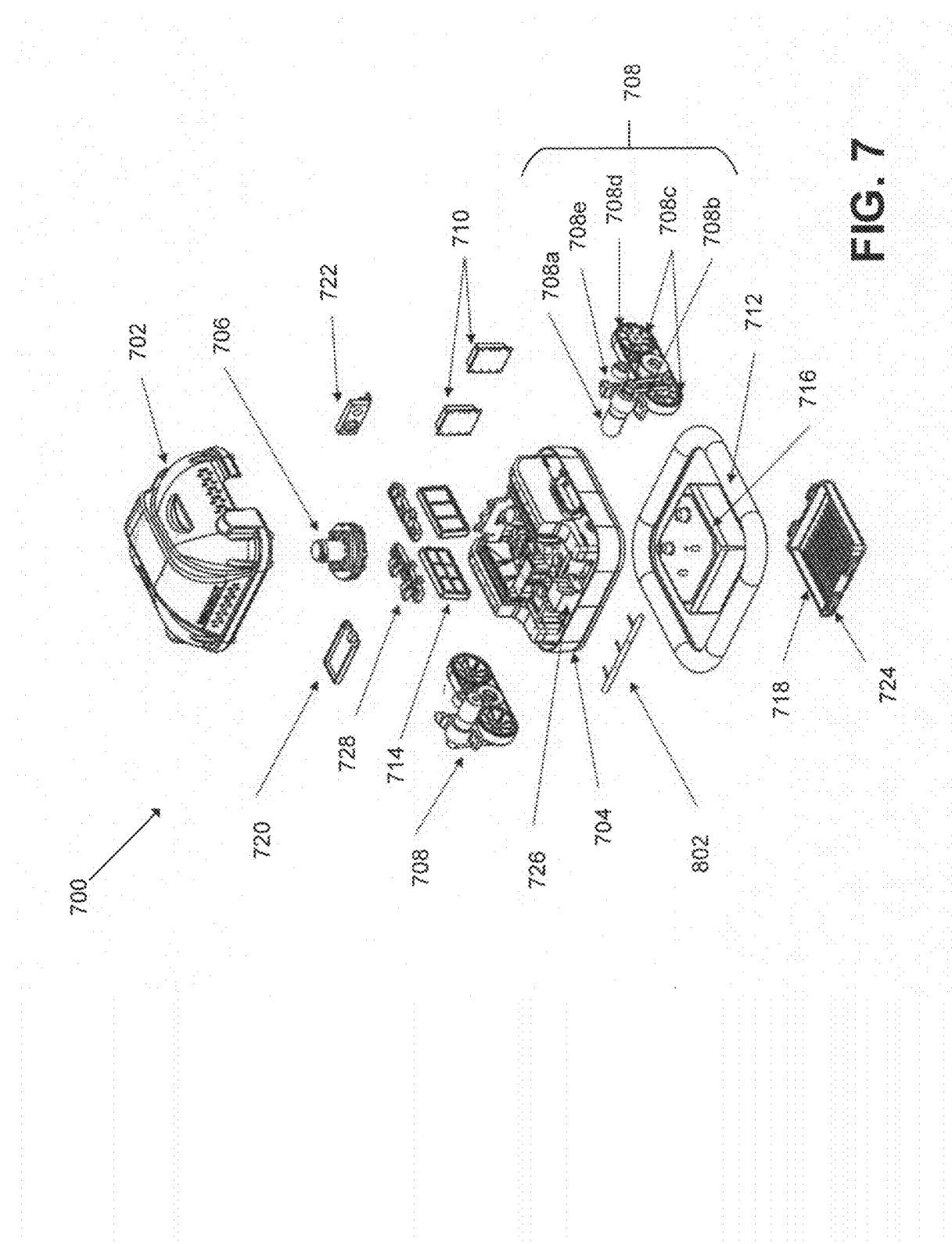
FIG. 7 is an exploded view of another apparatus for vertical mobility.

FIG. 7 depicts another apparatus 700 with a housing 704 and a cover 702. A vacuum motor assembly 706 draws air from gaps between the contact surface and bottom of housing unit and creates a vacuum around a central compartment 900, (see FIG. 9B). Intake air and/or exhaust air that drawn by the vacuum motor assembly 706 passes through air filters 714 inside the filter compartment (FIG. 8C) to avoid damage of the impeller by the debris. The filter compartment is protected by filter compartment covers 728. The air flows within the drive wheel compartment and filter compartment along the manifold created by the inner surface of the compartments as shown in FIG. 8 C. A flexible seal 712 is also provided. An electronics control board 720 comprises a microprocessor that controls the operation of the drive motor controller 710, and the vacuum motor assembly 706 through vacuum motor controller 726, via a power and signal connector 722.

In the embodiment of FIG. 7, the means for moving 708 is a tank tread that consists of a drive motor 708*a*, a time belt 708*b*, two wheels 708*c* that are connected by a tread 708*d* and a fastener 708*e*. The drive motor 800 (see FIG. 8A) is operatively connected to the housing 704 by fasteners 708*e* and controlled by the drive motor controller 710. The drive wheels 708*c* and treads 708*d* are enclosed inside the drive wheel compartment. The timing belt 708*b* connects to both the drive motor 800 and the drive wheel 708*c*.

Figure 8A:
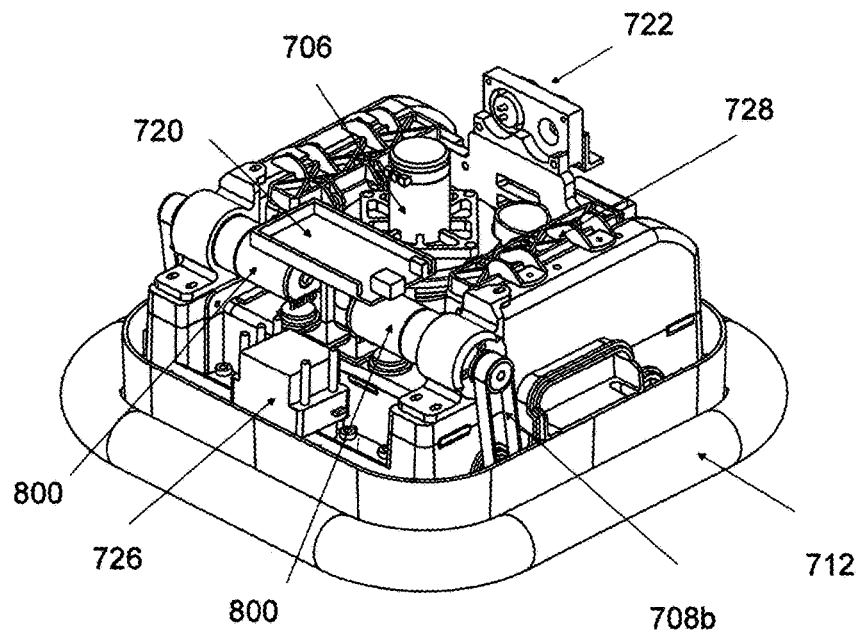
FIG. 8A is a top perspective view of the apparatus of FIG. 7 with a cover removed.
Figure 8B:
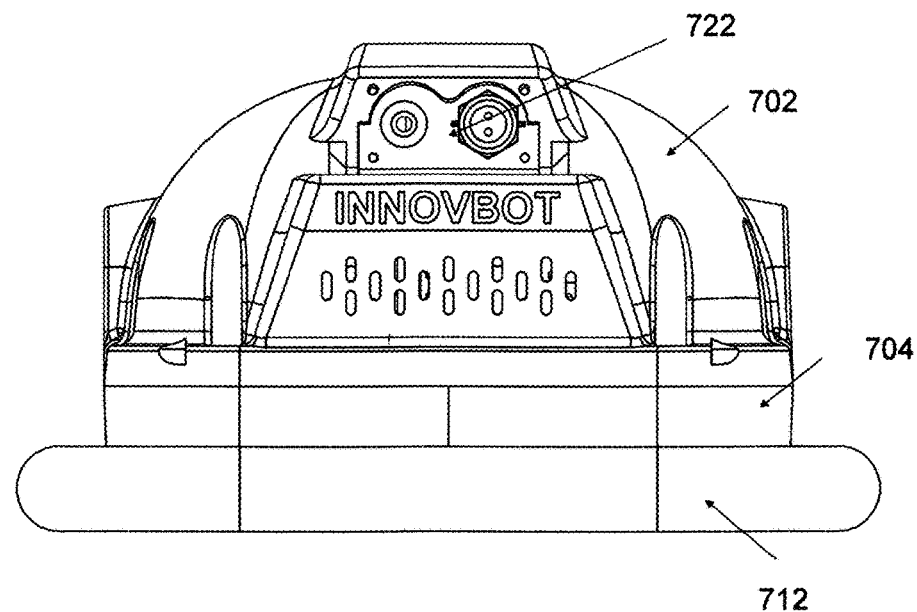
FIG. 8B is a front view of the apparatus of FIG. 7 with the cover attached.
Figure 8C:
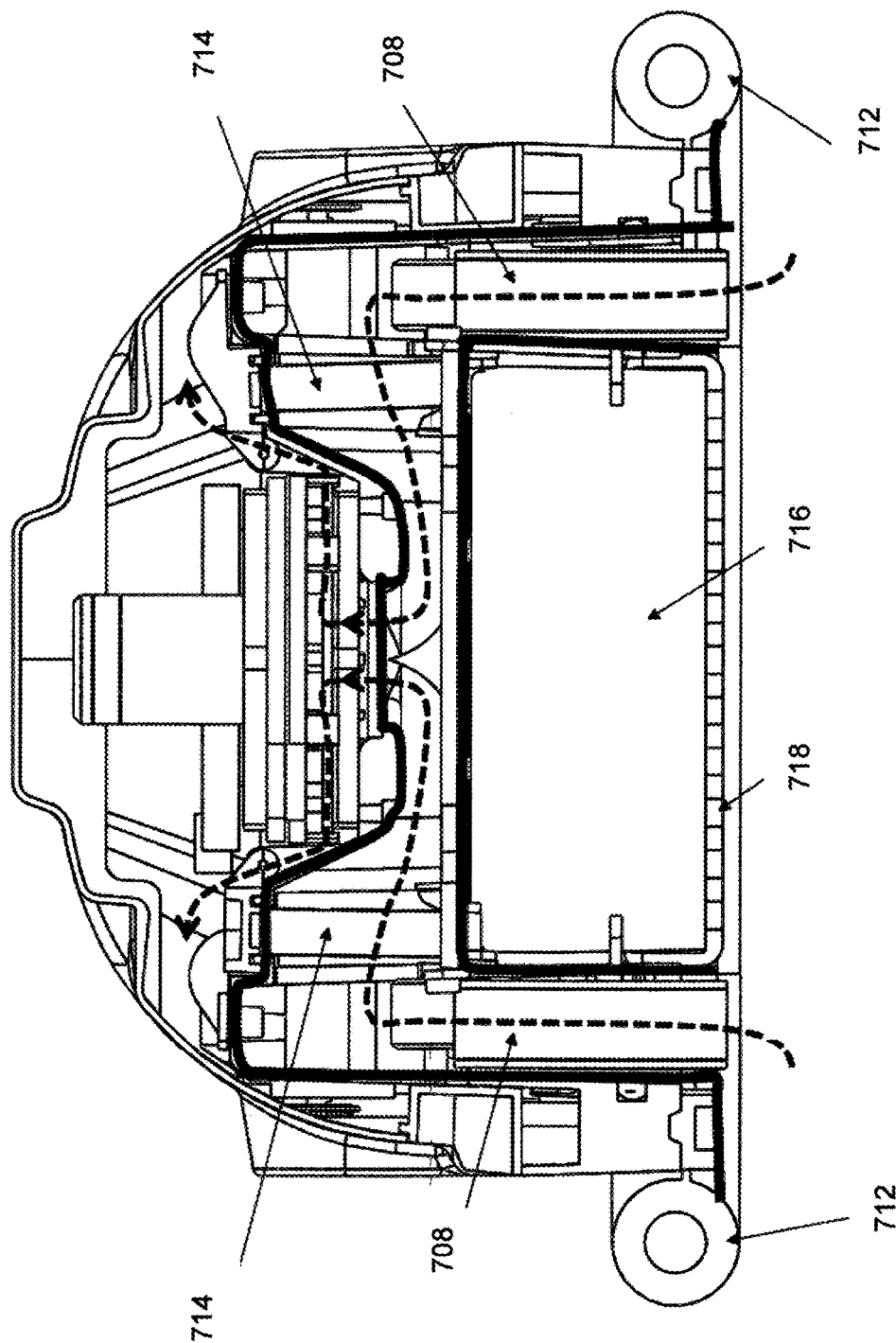
FIG. 8C is a cut-off view of the apparatus of FIG. 7 showing the air flow.

FIG. 8B provides a front view of the apparatus 700, where the flexible seal 712 circumscribes and overhangs the housing 704.

Figure 8D:
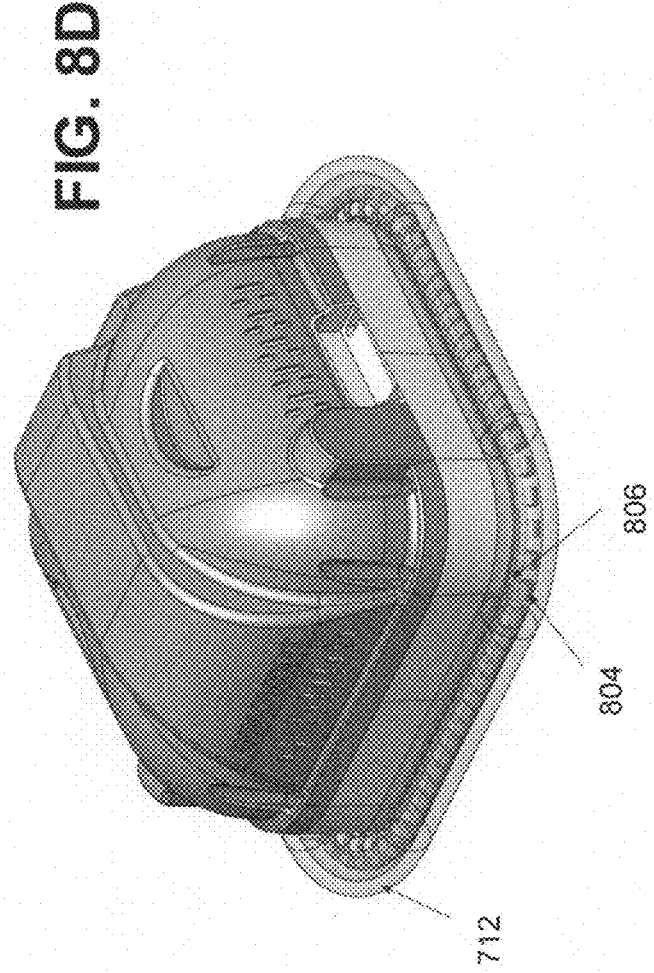
FIG. 8D is a front view of the apparatus of FIG. 7 showing the flexible foam seal with multiple sections of rod and spring strips.
Figure 8E:
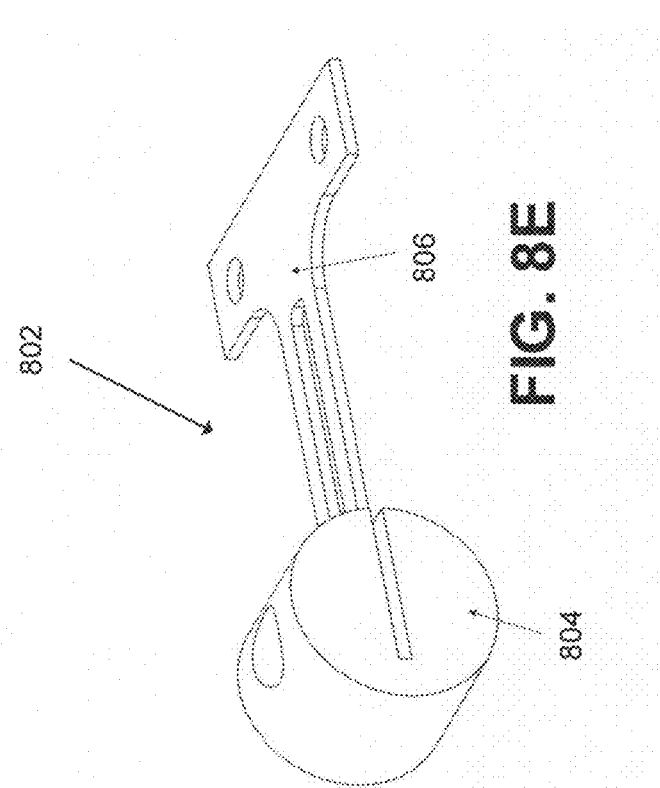
FIG. 8E illustrates one rod and spring strip.

As shown in FIG. 8D, a flexible seal 712 circumscribes the housing 704 and creates a vacuum chamber to adhere to a wall surface. The flexible seal 712 around the perimeter is designed to provide the maximum area for adhesion force, conforming to the surface textures, features and geometry of the wall, while limiting its own force onto the surface. This is made possible by making the physical attachment to the housing very flexible. One flexible seal design is a low density foam wrapped inside a nylon fabric pocket. Multiple sections of rod and spring strip assembly 802 (see FIG. 8 E) are inserted inside the pocket and circumscribe the perimeter of the housing unit. Each rod and spring strip assembly 802 comprises a rod 804 and a spring strip 806. Each section can push down the foam by the bended spring strip to conform to surface curvature. The low density foam conforms to surface geometry and the nylon fabric fills in gaps while making the flexible seal relatively air tight. Nylon is abrasion resistant and has a low friction coefficient useful for sliding across rough surfaces like concrete. The flexible seal 712 is connected to the chamber by fastening/screwing the pocket rim into the housing edge with a plastic ring. This way, the majority of the adhesion force goes directly to the vacuum chamber and therefore the means for moving (e.g., drivetrain) 708, and only a small percentage of the down force is exerted onto the flexible seal 712, thereby allowing the apparatus 700 to move across the surface with minimal friction.

The central compartment 900 is a cavity with four walls to fit around a payload 716 (e.g. GPR sensors or other NDT instrument) so that it may move up and down, but not laterally. The payload 716 is held within the central compartment 900 by a skid 718. The skid 718 has four latches 724 (see FIG. 7 and FIG. 9A) that attach to four hooks 902 on the housing 704 (see FIG. 9B). The hook and latch pairs enable the skid to move vertically, but not laterally, within the vacuum chamber. Four rod and spring strip assemblies 802 on the bottom of the central compartment push the payload against the skid. The vertical motion of the skid enables the height adjustment for the skid to cross over bumps on wall surface.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A robotic device for providing vertical mobility, the robotic device comprising:
   a housing enclosing a vacuum chamber that is exposed to an opening on a lower surface of the housing;
   a flexible seal circumscribing the opening;
   a plurality of rod and spring strips configured to apply a downward force to the flexible seal;
   a payload disposed inside a central compartment, the payload being supported by a skid that is vertically mobile;
   a vacuum motor assembly operatively connected to the vacuum chamber;
   a means for moving the robotic device across a surface, the means for moving being at least one wheel or at least one tank tread;
   wherein actuation of the vacuum motor assembly creates a vacuum in the vacuum chamber that pulls the housing toward the surface such that the means for moving is pressed against the surface.

2. The robotic device as recited in claim 1, wherein the central compartment is square.

3. The robotic device as recited in claim 1, wherein the central compartment is square and comprises a ground penetration radar unit.

4. The robotic device as recited in claim 3, wherein the ground penetration radar unit is exposed to the surface through the opening.

5. The robotic device as recited in claim 1, wherein the flexible seal is larger than a perimeter of the vacuum chamber.

6. The robotic device as recited in claim 1, wherein the flexible seal defines a seal perimeter and the means for moving is disposed within the seal perimeter.

7. The robotic device as recited in claim 1, wherein the flexible seal is wrapped within a flexible fabric pocket.

8. The robotic device as recited in claim 1, wherein the flexible seal is wrapped within a flexible nylon fabric pocket.

9. The robotic device as recited in claim 1, wherein the vacuum motor assembly comprises an impeller, the robotic device further comprising a filter compartment with at least one filter, the vacuum motor assembly configured to pull air through the vacuum chamber and through the at least one filter before the air passes through the impeller of the vacuum motor assembly, thereby protecting the vacuum motor assembly from debris.

10. A robotic device for providing vertical mobility, the robotic device comprising:
    a housing enclosing a vacuum chamber that is exposed to an opening on a lower surface of the housing, the vacuum chamber has a central compartment with a payload disposed therein;
    a flexible seal that circumscribes the opening;
    a vacuum motor assembly operatively connected to the vacuum chamber;
    a means for moving the robotic device across a surface, the means for moving being at least one wheel or at least one tank tread, wherein the means for moving is directly connected to the housing such that actuation of the vacuum motor assembly creates a vacuum in the vacuum chamber and pulls the housing toward the surface such that the means for moving is pressed against the surface;
    wherein the payload is supported by a skid such that the payload is vertically mobile, but not laterally mobile, within the central compartment.

11. The robotic device as recited in claim 10, wherein the payload is a nondestructive testing instrument.

12. The robotic device as recited in claim 10, wherein the payload is a ground penetration radar unit.

13. A robotic device for providing vertical mobility, the robotic device comprising:

a housing enclosing a vacuum chamber that is exposed to an opening on a lower surface of the housing;
a flexible seal circumscribing the opening;
a plurality of rod and spring strips configured to apply a downward force to the flexible seal;
a ground penetration radar unit disposed inside a central compartment that is within the housing, the ground penetration radar unit being supported by a skid that is vertically mobile,
wherein the ground penetration radar unit is supported by a skid such that the ground penetration radar unit is vertically mobile, but not laterally mobile, within the central compartment;
a vacuum motor assembly operatively connected to the vacuum chamber;
a means for moving the robotic device across a surface, the means for moving being at least one wheel or at least one tank tread;
wherein actuation of the vacuum motor assembly creates a vacuum in the vacuum chamber that pulls the housing toward the surface such that the means for moving is pressed against the surface.

14. The robotic device as recited in claim 13, wherein the flexible seal defines a seal perimeter and the means for moving is disposed within the seal perimeter.

15. The robotic device as recited in claim 13, wherein the flexible seal is wrapped within a flexible fabric pocket.

16. The robotic device as recited in claim 13, wherein the flexible seal is wrapped within a flexible nylon fabric pocket.

* * * * *